United States Patent
Guo

(10) Patent No.: US 9,673,902 B2
(45) Date of Patent: Jun. 6, 2017

(54) VISIBLE LIGHT COMMUNICATION SYSTEM

(71) Applicant: ZTE Corporation, Shenzhen (CN)

(72) Inventor: Yang Guo, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 58 days.

(21) Appl. No.: 14/429,113

(22) PCT Filed: Jul. 16, 2013

(86) PCT No.: PCT/CN2013/079462
§ 371 (c)(1),
(2) Date: Mar. 18, 2015

(87) PCT Pub. No.: WO2013/174309
PCT Pub. Date: Nov. 28, 2013

(65) Prior Publication Data
US 2015/0249497 A1    Sep. 3, 2015

(30) Foreign Application Priority Data
Sep. 18, 2012 (CN) .......................... 2012 1 0346474

(51) Int. Cl.
H04B 10/116 (2013.01)
(52) U.S. Cl.
CPC .................. H04B 10/116 (2013.01)
(58) Field of Classification Search
CPC .............. H04B 10/116; H04B 10/1143; H04B 10/1149
See application file for complete search history.

(56) References Cited

U.S. PATENT DOCUMENTS

2011/0069971 A1* 3/2011 Kim ..................... H04B 10/116
                                                    398/172
2011/0105134 A1* 5/2011 Kim .................... H04W 72/048
                                                    455/450
(Continued)

FOREIGN PATENT DOCUMENTS

CN    101232329 A    7/2008
CN    101814955 A    8/2010
(Continued)

OTHER PUBLICATIONS

International Search Report for corresponding application PCT/CN2013/079462 filed Jul. 16, 2013; Mail date Oct. 24, 2013.
(Continued)

Primary Examiner — Dzung Tran
(74) Attorney, Agent, or Firm — Cantor Colburn LLP

(57) ABSTRACT

A visible light communication system is provided. The communication system includes at least one of a FFD and a visible light communication light source, and a RFD, wherein the visible light communication light source is configured to carry data information in a visible light signal and send the visible light signal; the RFD is in communication with the FFD and/or in communication with the visible light communication light source, and is configured to receive the visible light signal and demodulate the received visible light signal to recover data information; and the FFD is configured to achieve at least one of the following functions: the function of the visible light communication light source, the function of the RFD, and a function for forwarding the received visible light signal. In the present invention, the technical problem that visible light resources cannot be used fully because there is no network structure used for the visible light communications in the conven- (Continued)

tional art is solved, thereby achieving the technical effect of improving the utilization rate of the visible light.

16 Claims, 2 Drawing Sheets

(56) References Cited

U.S. PATENT DOCUMENTS

| 2012/0106977 A1* | 5/2012 | Ma | H04B 10/116 |
| | | | 398/172 |
| 2012/0224860 A1* | 9/2012 | Kim | H04B 10/116 |
| | | | 398/128 |

FOREIGN PATENT DOCUMENTS

| CN | 102610115 A | 7/2012 |
| CN | 102625509 A | 8/2012 |

OTHER PUBLICATIONS

IEEE Standard, IEEE802.15.7 "Part 15.7: Wireless Medim Access Control (MAC) and Physical Layer (PHY) Specifications for Visible Light Wireless Personal Area Networks (WPANS)", vol. 802,15.7, Dec. 10, 2009, pp. 1-286, XP017636050, Piscataway, NJ USA retrieved on Dec. 10, 2009.

European Search Report for corresponding application PCT/CN2013/079462 Mail date Aug. 9, 2015.

\* cited by examiner

VISIBLE LIGHT COMMUNICATION SYSTEM

TECHNICAL FIELD

The present invention relates to the field of communications, and in particular to a visible light communication system.

BACKGROUND

In recent years, the wireless communication technology using a visible light has gradually attracted widespread attention from academia and industry circles, especially with the wide use of the lightning equipment of light emitting elements like a light emitting diode (LED), while a semiconductor LED is used to achieve lightning, a feasibility study for realizing wireless communication network coverage is carried out in many related businesses. It can be seen that a communication mode of combining light communication, wireless sensor network, wireless local area network (WLAN) and power line communication system is also in discussion. However, it can be determined that the visible light communication technology will be one of optional short-range ultra wide band communication modes in the future.

As a light emitting component for high-speed light data communication, and considering the influences on human body or medical equipment, an LED is a most powerful candidate. At the same time, a semiconductor light emitting device with higher-speed response performance, for example a laser diode (LD) or a super luminescent diode (SLD) also can be used as a visible light communication device for sending the visible light carrying data information. The data rate in the light communication depends on the response speed of a light emitting device. Because of the reason, the light emitting device with higher-speed response performance attracts more attention.

The basic principle for realizing visible light LED communication is to perform a certain modulation on emitted light through data to be sent, such as pulse width modulation, pulse location/frequency modulation or pulse amplitude modulation. This modulated light energy is transmitted through a space channel and is received by a photoelectric detector (or a sensor) on a target apparatus, and after the photoelectric detector converts a light signal into an electrical signal, and after subsequent processing, data carried in the light signal is demodulated.

According to application scenarios of the visible light in the future and its special features, portable devices equipped with a camera will become more and more. Various LEDs are used as information publishing systems, and various portable/mobile terminals are served as receiving systems, which will be a simple communication mode. The topology networking transmission method among visible light communication nodes will further influence the technical development of a visible light communication system. Although the visible light communication technology has the above-mentioned advantages, a topology networking mode for various communication nodes in the visible light communication system is not proposed at present so that visible light resources cannot be effectively used.

Aiming at the above-mentioned problem, no effective solution has been provided at present.

SUMMARY

The embodiments of the present invention provide a visible light communication system so as to at least solve the technical problem that visible light resources cannot be used fully because there is no network structure used for the visible light communications in the conventional art.

According to one aspect of the present invention, a visible light communication system is provided, and the system includes: at least one of a full function device (FFD) and a visible light communication light source, and a reduced function device (RFD), wherein the above-mentioned visible light communication light source is configured to carry data information into a visible light signal and send the above-mentioned visible light signal; the above-mentioned RFD is in communication with the above-mentioned FFD and/or in communication with the visible light communication light source, and is configured to receive the above-mentioned visible light signal and demodulate the above-mentioned received visible light signal to recover above-mentioned data information; and the FFD is configured to achieve at least one of the following functions: the function of the above-mentioned visible light communication light source, the function of the above-mentioned RFD, and a forwarding function for forwarding the received visible light signal.

Preferably, the above-mentioned visible light communication light source sends the above-mentioned visible light signal carrying data information in broadcast mode.

Preferably, the above-mentioned visible light communication system further comprises a broadcast signal source connected to the above-mentioned visible light communication light source, configured to send a signal to be broadcasted to the above-mentioned visible light communication light source as the above-mentioned data information.

Preferably, the above-mentioned RFD is further provided with a sending apparatus, configured to carry data information in the visible light signal and send the above-mentioned visible light signal.

Preferably, during the same duration, the above-mentioned RFD receives the light signal of at most one of the above-mentioned visible light communication light sources or receives the visible light signal sent by at most one of the above-mentioned FFDs.

Preferably, the above-mentioned FFD is further configured to receive the above-mentioned visible light signal carrying the data information sent by a FFD except the FFD itself, and forward the received visible light signal to one or more of the above-mentioned RFD.

Preferably, the above-mentioned visible light communication light source is a traffic indicator light.

Preferably, the above-mentioned RFD is a device carrying a camera function.

Preferably, the above-mentioned visible light signal carrying data information is a light and dark blinking signal emitted by a fluorescent light and/or a light emitting diode.

In the embodiments of the present invention, a visible light communication system is provided, and the system may includes a FFD, a RFD or a visible light communication light source, etc., thereby forming communication systems with different architectures according to requirements so as to satisfy different communication requirements. The above-mentioned mode solves the technical problem that visible light resources cannot be used fully because there is no network structure used for the visible light communications in the prior art, thereby achieving the technical effect of improving the utilization rate of the visible light.

BRIEF DESCRIPTION OF THE DRAWINGS

Drawings, provided for further understanding of the embodiments of the present invention and forming a part of the specification, are used to explain the embodiments of present invention together with embodiments of the present invention rather than to limit the embodiments of present invention. In the accompanying drawings.

DESCRIPTION OF EMBODIMENTS

The embodiments of the present invention will be described hereinafter in detail with reference to the accompanying drawings and in conjunction with embodiments. It should be noted that the embodiments and the characteristics of the embodiments can be combined with each other if no conflict is caused.

Figure 1:
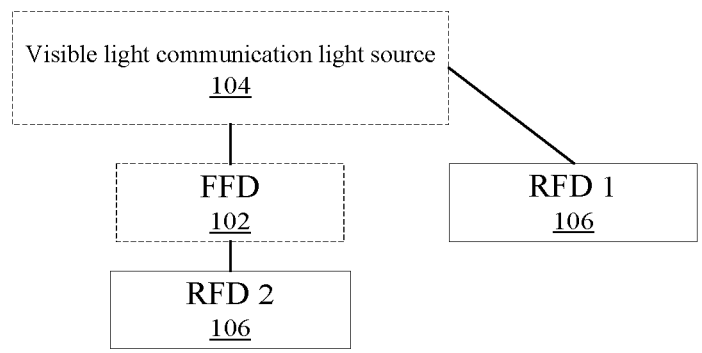
FIG. 1 is a structure schematic diagram of a visible communication system according to an embodiment of the present invention.

The embodiments of the present invention provide a visible light communication system, and as shown in FIG. 1, the communication system includes at least one of a FFD 102 and a visible light communication light source 104 as well as a RFD 106, and the above-mentioned several devices are described in detail in the following.

The visible light communication light source 104 is configured to carry data information in a visible light signal and send the visible light signal;

RFD 106 is in communication with the FFD and/or in communication with the visible light communication light source, and is configured to receive the visible light signal and demodulate the received visible light signal to recover data information; and FFD 102 is configured to achieve at least one of the following functions: the function of the visible light communication light source, the function of the RFD, and a forwarding function for forwarding the received visible light signal.

In the above-mentioned embodiments, a visible light communication system is provided, and the system may includes a FFD, a RFD or a visible light communication light source, etc., thereby forming communication systems with different architectures according to requirements so as to satisfy different communication requirements. The above-mentioned mode solves the technical problem that visible light resources cannot be used fully because there is no network structure used for the visible light communications in the prior art, thereby achieving the technical effect of improving the utilization rate of the visible light.

Preferably, the visible light signal carrying data information is a high-speed light and dark blinking signal emitted by a fluorescent light and/or a light emitting diode and cannot be seen by human eyes.

Considering the particularity of a sending light source in a network topology, such as a signal lamp, and for a visible light communication source, rather common light emitting devices, such as these signal lamps, may be selected to carry data information so as to play the broadcast role, that is, the above-mentioned visible light communication light source may send the above-mentioned visible light signal carrying data information in broadcast mode.

In an embodiment, since a visible light communication light source is used for broadcasting a signal, a broadcast signal source connected to same is naturally needed, that is, the above-mentioned visible light communication system further comprises the broadcast signal source connected to the visible light communication light source, which is configured to send a signal to be broadcasted to the above-mentioned visible light communication light source as the above-mentioned data information.

If not considering the reduction of a device, but paying more attention to perfectness of functions of the device, a RFD in a system may also be provided with a sending apparatus, which is configured to carry data information in a visible light signal and send the visible light signal. That is, the RFD may not only receive the visible light signal, but also send the visible light signal, thereby realizing more comprehensive information interaction and more comprehensive communication flow.

Since the RFD is more used as a single node in a communication system, during the same duration, the RFD merely receives the light signal sent by at most one of the above-mentioned visible light communication light sources or sent by at most one of the above-mentioned FFDs.

With regard to the FFD mentioned above, same further has a forwarding function except for receiving and sending functions, and particularly, the above-mentioned FFD, after receiving the above-mentioned visible light signal carrying the data information sent by a FFD except the FFD itself, can forward the received visible light signal to one or more of the above-mentioned RFD. The above-mentioned content is merely an embodiment, and the present invention is not limited to this; the FFD may also forward received visible light signals sent by a certain RFD to another RFD, or forward the received visible light signal sent by a visible light source to other FFDs or the RFDs in communication with the FFD itself, etc.

A traffic indicator lamp is a rather common light emitting device; therefore, in an embodiment, in order to effectively use traffic lamps on the road, the traffic indicator lamps may be used as a visible light communication light source to realize the target of broadcast.

In the above-mentioned various embodiments, the RFD may be a device with camera function. For example, a mobile phone, a camera, a laptop, etc. all can be RFDs.

Particularly, visible light communication may be realized according to the following mode: a user performs communication with a central processor through a handheld control terminal or the mode of remote computer login based on transmission control protocol/Internet Protocol (TCP/IP), and communication contents comprise expected operation instructions on a controlled device by a user, and a central controller parses the instructions to generate binary coding streams of corresponding LED lamp modulation, and preferably may simultaneously drive multiple transmitting modulators; and the transmitting modulators modulate the switch state of light intensity of an LED lamp according to the binary coding streams so as to form a light intensity variation sequence within a time domain. At a receiving party, a controlled user equipment will be implanted with a receiving demodulator after corresponding transformation and upgrading, wherein the demodulator detects light and dark variation of light intensity of an LED, etc., and converts a light signal into an electrical signal, and a micro-processing unit of a demodulation device will generate corresponding control movements according to received information.

In order to better illustrate the present invention, the embodiments also give the following two preferred topology structures for further description.

Figure 2:
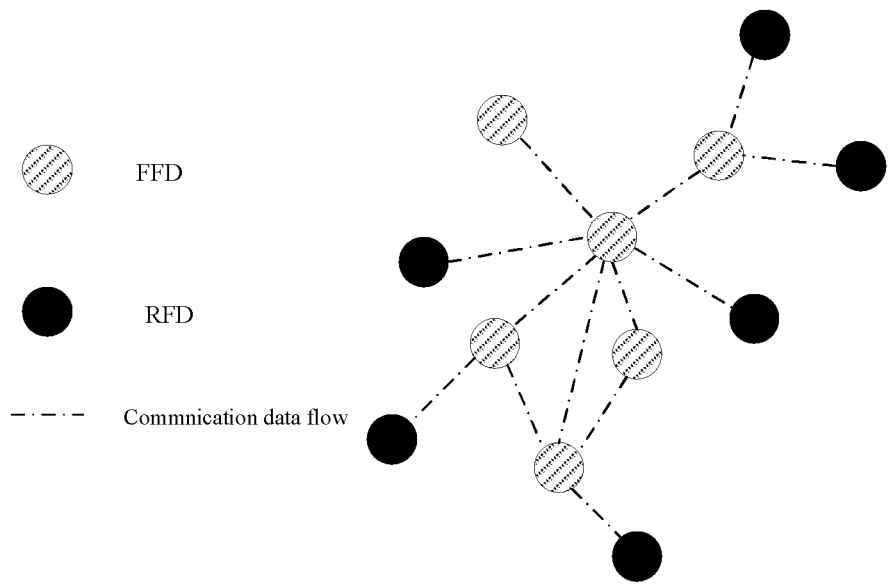
FIG. 2 is a schematic diagram of a visible communication system topology diagram according to an embodiment of the present invention.

1) The first type is a network topology structure for short-range wireless communication, and each terminal device plays roles of different network nodes in a network, and as shown in FIG. 2, the network topology structure mainly comprises a FFD and a RFD, wherein the FFD can not only used as a coordinator, but also used as a simple node; meanwhile, the FFD can form any topology structure and can communication with any device.

The RFD can only be used as a single node, that is, the RFD has the sending or receiving capacity but does not have forwarding capacity.

In this type of network topology only including the RFD and the FFD, the RFD can only communicate with the FFD, and the RFD can only communication with one FFD during the same duration.

That is, in the first type topology structure, the FFD not only can be used as a network coordinator, but also can be used as a single node, and can communicate with any node of any topology structure; and the RFD is merely used as a single node, and communicates with the network coordinator, but cannot communicate with the single node.

With regard to visible light communication, a sending function is provided by a visible light sending device, and a receiving function is provided by a visible light receiving device, such as a camera. The FFD needs to be equipped with a visible light sending and receiving apparatus as well as a network function as a coordinator; however, the RFD merely needs to be equipped with the visible light sending and receiving apparatus, even a part of the RFD can merely equipped with the receiving apparatus.

Figure 3:
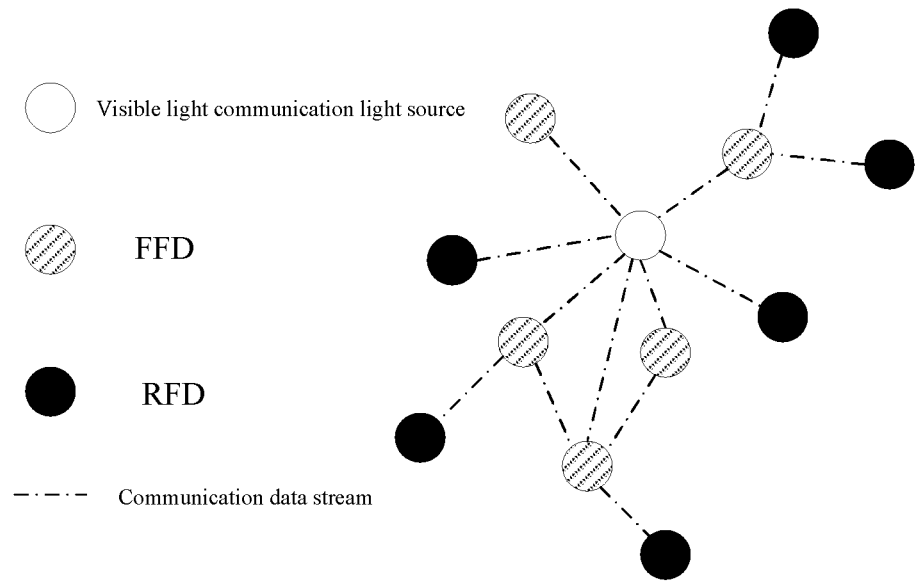
FIG. 3 is a schematic diagram of a visible communication system topology diagram according to an embodiment of the present invention.

2) Based on the particularity of a sending light source in a network topology, such as a signal lamp, the embodiments of the present invention further provide another type of network topology structure, which can be applied in the scenario of broadcast application, and as shown in FIG. 3, the network topology structure includes: a visible light communication light source, a FFD and a RFD, wherein the visible light communication light source is connected to a broadcast signal source, which is configured to broadcast a signal of a broadcast system and is merely equipped with a sending apparatus, but does not need functions of the receiving apparatus and network coordinator.

The FFD not only can be used as a coordinator, but also can be used as a single node, and can form any topology structure, that is, same may be located in any location of the topology structure and may communicate with all devices in the system.

The RFD can merely used as the single node, i.e. merely being responsible for receiving or sending the visible light signal carrying data information, but does not have the forwarding function, and can merely form a star topology in the topology structure, and can merely communicate with one network coordinator (i.e. one FFD) during the same duration, or can merely receive the visible light signal sent by one visible light communication light source during the same duration.

Figure 4:
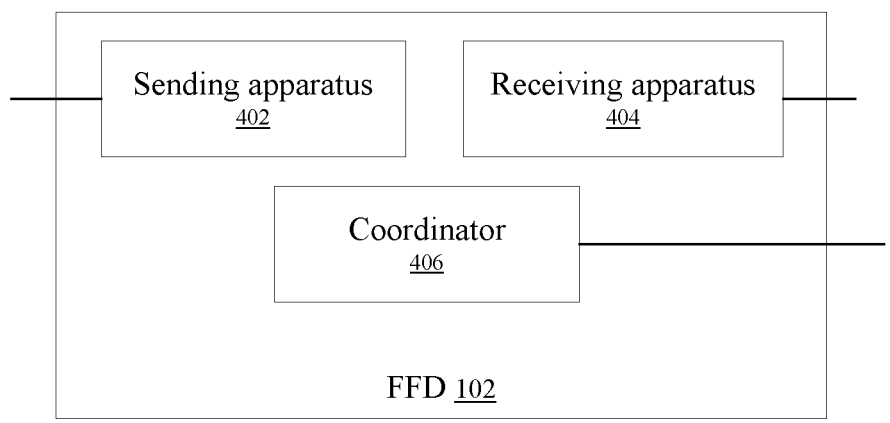
FIG. 4 is a structural diagram of a FFD according to an embodiment of the present invention.

For a visible light communication system, many application scenarios have a scenario similar to broadcast application, for example: the visible light communication technology may be applied in a traffic management system, and while a signal lamp performs traffic instructions, same also can send information about road conditions, etc. in broadcast mode, and for these broadcast light sources (i.e. a visible light communication light source), same may be merely equipped with a sending apparatus and does not need a receiving apparatus and a function apparatus of a network coordinator. For FFD 102, as shown in FIG. 4, same needs be equipped with all functions of a sending apparatus 402, a receiving apparatus 404 and a coordinator 406, wherein these sending apparatus 402, receiving apparatus 404 and the coordinator 406 communicate with other FFDs except for the FFD itself or RFD as well as visible light communication light source, so as to forward the information.

However, it is of interest to note that the above-mentioned two types of topology structures are merely preferred embodiments of the present invention, and other combination modes may be also used, for example, the whole network is provided with a FFD, or in a small communication network, merely the FFD and a visible light communication light source are provided, or the visible light communication light source or a RFD are provided, etc.

In another embodiment, a software is also provided, and the software is used to execute the above-mentioned embodiments or the technical solution described in the preferred embodiment.

In another embodiment, a storage medium is also provided, wherein the storage medium stores the above-mentioned software, and the storage medium comprises but is not limited to an optical disk, a soft disk, a hard disk, an erasable storage, etc.

It can be seen from the above-mentioned description that the embodiments of the present invention realize the following technical effects: a visible light communication system is provided, and the system may includes a FFD, a RFD or a visible light communication light source, etc., thereby forming communication systems with different architectures according to requirements so as to satisfy different communication requirements. The above-mentioned mode solves the technical problem that visible light resources cannot be used fully because there is no network structure used for the visible light communications in the prior art, thereby achieving the technical effect of improving the utilization rate of the visible light.

Apparently, those skilled in the art shall understand that the above modules and steps of the embodiments of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. Thus, the embodiments of the present invention are not limited to any particular combination of hardware and software.

The above description is only the preferred embodiments of the present invention, and is not intended to limit the present invention; for those skilled in the art, the embodiments of the present invention can be modified and changed variously. Any modification, equivalent replacement, or improvement made within the spirit and principle of the present invention shall all fall within the protection scope of the present invention.

What is claimed is:

1. A visible light communication system, comprising: at least one of a Full Functional Device (FFD) and a visible light communication light source, and a Reduced Functional Device (RED), wherein the visible light communication light source, configured to send a visible light signal carrying data information;

the RFD, configured to communicate with the FFD and/or the visible light communication light source, and receive the visible light signal and demodulate the received visible light signal to recover the data information, wherein during the same duration, the RFD receives the light signal sent by one visible light communication light source or by one FFD; and the FFD, configured to implement the following functions: the function of the visible light communication light source, the function of the RFD, and a forwarding function for forwarding the received visible light signal.

2. The light communication system according to claim 1, wherein the visible light communication light source sends the visible light signal carrying the data information by broadcast.

3. The light communication system according to claim 2, wherein the system further comprises a broadcast signal source connected to the visible light communication light source, and the broadcast signal source is configured to send a signal to be broadcasted to the visible light communication light source as the data information.

4. The light communication system according to claim 3, wherein the visible light communication light source is a traffic light.

5. The light communication system according to claim 3, wherein the RFD is a device with camera function.

6. The light communication system according to claim 1, wherein the RFD is further equipped with a sending apparatus, and the sending apparatus is configured to carry the data information into the visible light signal and send the visible light signal.

7. The light communication system according to claim 6, wherein the visible light communication light source is a traffic light.

8. The light communication system according to claim 6, wherein the RFD is a device with camera function.

9. The light communication system according to claim 6, wherein the visible light signal carrying data information is a light and dark blinking signal emitted by a fluorescent light and/or a light emitting diode.

10. The light communication system according to claim 1, wherein the FFD is further configured to receive the visible light signal carrying the data information sent by a FFD except the FFD itself, and forward the received visible light signal to one or more of the RFDs.

11. The light communication system according to claim 10, wherein the visible light communication light source is a traffic light.

12. The light communication system according to claim 10, wherein the RFD is a device with camera function.

13. The light communication system according to claim 10, wherein the visible light signal carrying data information is a light and dark blinking signal emitted by a fluorescent light and/or a light emitting diode.

14. The light communication system according to claim 1, wherein the visible light communication light source is a traffic light.

15. The light communication system according to claim 1, wherein the RFD is a device with camera function.

16. The light communication system according to claim 1, wherein the visible light signal carrying data information is a light and dark blinking signal emitted by a fluorescent light and/or a light emitting diode.

* * * * *